(12) United States Patent
Herington et al.

(10) Patent No.: US 12,066,925 B2
(45) Date of Patent: Aug. 20, 2024

(54) METHOD AND SYSTEM FOR INTEGRATION TEST MONITORING AND MANAGEMENT

(71) Applicant: JPMorgan Chase Bank, N.A., New York, NY (US)

(72) Inventors: Dan Herington, Frisco, TX (US); Russell E Colwell, Tampa, FL (US); David M Lin, Addison, TX (US); Maureen Loach, Apollo Beach, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 107 days.

(21) Appl. No.: 17/986,356

(22) Filed: Nov. 14, 2022

(65) Prior Publication Data
US 2023/0161693 A1   May 25, 2023

Related U.S. Application Data

(60) Provisional application No. 63/264,466, filed on Nov. 23, 2021.

(51) Int. Cl.
G06F 11/36   (2006.01)

(52) U.S. Cl.
CPC ...... *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 11,132,357 B1 * | 9/2021 | Garapati | G06F 16/26 |
| 2003/0046613 A1 * | 3/2003 | Farchi | G06F 11/3676 |
| | | | 714/38.1 |
| 2003/0046681 A1 * | 3/2003 | Barturen | G06F 8/71 |
| | | | 717/172 |
| 2005/0216555 A1 * | 9/2005 | English | G06Q 50/18 |
| | | | 709/204 |
| 2011/0067005 A1 * | 3/2011 | Bassin | G06F 8/10 |
| | | | 717/127 |
| 2020/0334134 A1 * | 10/2020 | Kalyanaraman | G06F 11/3688 |
| 2021/0326336 A1 * | 10/2021 | Garapati | G06F 16/2465 |

(Continued)

FOREIGN PATENT DOCUMENTS

CN   108829584 A   * 11/2018   ......... G06F 11/3624

*Primary Examiner* — Philip Wang
(74) *Attorney, Agent, or Firm* — Greenblum & Bernstein, P.L.C.

(57) ABSTRACT

A method for providing integration test monitoring and management is disclosed. The method includes receiving, via an application programming interface, an integration contract, the integration contract relating to a dependency agreement between applications; mapping a dependency for each of the applications based on the integration contract; receiving, via the application programming interface, a request that relates to a regression testing request for an application; identifying a test from a test suite based on the request and a result of the mapping; automatically initiating, via an integration layer, the identified test based on a predetermined parameter; and capturing, via an application programming interface, a test result that corresponds to the automatically initiated test.

20 Claims, 5 Drawing Sheets

(56) References Cited

U.S. PATENT DOCUMENTS

| | | | |
|---|---|---|---|
| 2022/0244950 A1* | 8/2022 | Novak | G06F 8/34 |
| 2022/0398236 A1* | 12/2022 | Slavin | G06F 16/288 |
| 2023/0161693 A1* | 5/2023 | Herington | G06F 11/3692 |
| | | | 717/124 |
| 2024/0121261 A1* | 4/2024 | Long | H04L 63/20 |

* cited by examiner

METHOD AND SYSTEM FOR INTEGRATION TEST MONITORING AND MANAGEMENT

CROSS-REFERENCE TO RELATED APPLICATIONS

This application claims the benefit of U.S. Provisional Patent Application Ser. No. 63/264,466, filed Nov. 23, 2021, which is hereby incorporated by reference in its entirety.

BACKGROUND

1. Field of the Disclosure

This technology generally relates to methods and systems for integration testing, and more particularly to methods and systems for providing integration test monitoring and management by automatically executing test suites as part of a collaborative application development pipeline and automatically alerting affected dependencies of identified error conditions.

2. Background Information

Many business entities utilize expansive enterprise networks of applications to provide services for users. Often, the applications in the enterprise networks rely on one another for data and/or functionalities. Each of the applications may interact with corresponding dependent applications via programmatic interfaces. Historically, implementation of conventional techniques for application management and integration testing has resulted in varying degrees of success with respect to collaborative application development and effective deployment of applications into a production environment.

One drawback of using the conventional techniques is that in many instances, changes implemented on an application may have unintended consequences for corresponding dependent applications. For example, a proposed change for the application may inadvertently impact a programmatic interface that is used by the corresponding dependent applications. As a result, implementation of the proposed change may disrupt functionalities of the corresponding dependent applications.

Additionally, since integration contracts between applications are often informal and inconsistently documented, responsible parties for the corresponding dependent applications may not be aware of the impact of the proposed change until after the proposed change has been implemented in a production environment. As such, deployment of the proposed change in the production environment may cause enterprise network instability and/or major production outages.

Therefore, there is a need to provide integration test monitoring and management as part of a collaborative application development pipeline to enable consistent management of integration contracts, visible execution of regression and integration tests, as well as timely alerting of affected dependencies to detected error conditions.

SUMMARY

The present disclosure, through one or more of its various aspects, embodiments, and/or specific features or sub-components, provides, inter alia, various systems, servers, devices, methods, media, programs, and platforms for providing integration test monitoring and management by automatically executing test suites as part of a collaborative application development pipeline and automatically alerting affected dependencies of identified error conditions.

According to an aspect of the present disclosure, a method for providing integration test monitoring and management is disclosed. The method is implemented by at least one processor. The method may include receiving, via an application programming interface, at least one integration contract, the at least one integration contract may relate to a dependency agreement between a plurality of applications; mapping at least one dependency for each of the plurality of applications based on the at least one integration contract; receiving, via the application programming interface, at least one request, the at least one request may relate to a regression testing request for an application; identifying at least one test from a test suite based on the at least one request and a result of the mapping; automatically initiating, via an integration layer, the identified at least one test based on at least one predetermined parameter; and capturing, via an application programming interface, at least one test result that corresponds to the automatically initiated at least one test.

In accordance with an exemplary embodiment, the method may further include determining at least one fault condition based on the captured at least one test result; identifying, based on the result of the mapping, at least one impacted dependency that corresponds to the at least one fault condition; generating at least one report, the at least one report may include information that relates to at least one from among the at least one fault condition and the identified at least one impacted dependency; and transmitting at least one first notification in response to the at least one request, the at least one first notification may include the generated at least one report.

In accordance with an exemplary embodiment, the method may further include identifying at least one responsible party that is associated with the at least one impacted dependency; and transmitting at least one second notification to the identified at least one responsible party, the at least one second notification may include the generated at least one report.

In accordance with an exemplary embodiment, the at least one request may include the at least one predetermined parameter, the at least one predetermined parameter may relate to at least one from among an on-demand testing parameter and a scheduled testing parameter.

In accordance with an exemplary embodiment, prior to receiving the at least one request, the method may further include receiving onboarding data together with the test suite, the onboarding data may include a set of onboarding instructions that corresponds to the test suite and information that relates to the plurality of applications; and onboarding the test suite for the plurality of applications by using the onboarding data.

In accordance with an exemplary embodiment, to map the at least one dependency, the method may further include parsing the at least one integration contract to identify the at least one dependency for each of the plurality of applications; automatically requesting confirmation of the at least one integration contract from each of the at least one dependency; and mapping the at least one dependency based on a result of the requesting.

In accordance with an exemplary embodiment, to identify the at least one dependency for each of the plurality of applications, the method may further include extracting information that relates to the plurality of applications from the parsed at least one integration contract; and inferring the at least one dependency for each of the plurality of applications by using the extracted information.

In accordance with an exemplary embodiment, the information may include at least one from among integrated test suite information, shared communication protocol information, and common dependency information.

In accordance with an exemplary embodiment, to automatically initiate the identified at least one test via the integration layer, the method may further include automatically identifying at least one plug-in that corresponds to each of the identified at least one test, the at least one plug-in may enable communication with the identified at least one test and at least one associated testing tool; and automatically initiating, via the integration layer, each of the identified at least one test by using the corresponding at least one plug-in, wherein each of the identified at least one test may be automatically initiated based on the at least one predetermined parameter.

According to an aspect of the present disclosure, a computing device configured to implement an execution of a method for providing integration test monitoring and management is disclosed. The computing device including a processor; a memory; and a communication interface coupled to each of the processor and the memory, wherein the processor may be configured to receive, via an application programming interface, at least one integration contract, the at least one integration contract may relate to a dependency agreement between a plurality of applications; map at least one dependency for each of the plurality of applications based on the at least one integration contract; receive, via the application programming interface, at least one request, the at least one request may relate to a regression testing request for an application; identify at least one test from a test suite based on the at least one request and a result of the mapping; automatically initiate, via an integration layer, the identified at least one test based on at least one predetermined parameter; and capture, via the application programming interface, at least one test result that corresponds to the automatically initiated at least one test.

In accordance with an exemplary embodiment, the processor may be further configured to determine at least one fault condition based on the captured at least one test result; identify, based on the result of the mapping, at least one impacted dependency that corresponds to the at least one fault condition; generate at least one report, the at least one report may include information that relates to at least one from among the at least one fault condition and the identified at least one impacted dependency; and transmit at least one first notification in response to the at least one request, the at least one first notification may include the generated at least one report.

In accordance with an exemplary embodiment, the processor may be further configured to identify at least one responsible party that is associated with the at least one impacted dependency; and transmit at least one second notification to the identified at least one responsible party, the at least one second notification may include the generated at least one report.

In accordance with an exemplary embodiment, the at least one request may include the at least one predetermined parameter, the at least one predetermined parameter may relate to at least one from among an on-demand testing parameter and a scheduled testing parameter.

In accordance with an exemplary embodiment, prior to receiving the at least one request, the processor may be further configured to receive onboarding data together with the test suite, the onboarding data may include a set of onboarding instructions that corresponds to the test suite and information that relates to the plurality of applications; and onboard the test suite for the plurality of applications by using the onboarding data.

In accordance with an exemplary embodiment, to map the at least one dependency, the processor may be further configured to parse the at least one integration contract to identify the at least one dependency for each of the plurality of applications; automatically request confirmation of the at least one integration contract from each of the at least one dependency; and map the at least one dependency based on a result of the requesting.

In accordance with an exemplary embodiment, to identify the at least one dependency for each of the plurality of applications, the processor may be further configured to extract information that relates to the plurality of applications from the parsed at least one integration contract; and infer the at least one dependency for each of the plurality of applications by using the extracted information.

In accordance with an exemplary embodiment, the information may include at least one from among integrated test suite information, shared communication protocol information, and common dependency information.

In accordance with an exemplary embodiment, to automatically initiate the identified at least one test via the integration layer, the processor may be further configured to automatically identify at least one plug-in that corresponds to each of the identified at least one test, the at least one plug-in may enable communication with the identified at least one test and at least one associated testing tool; and automatically initiate, via the integration layer, each of the identified at least one test by using the corresponding at least one plug-in, wherein each of the identified at least one test may be automatically initiated based on the at least one predetermined parameter.

According to an aspect of the present disclosure, a non-transitory computer readable storage medium storing instructions for providing integration test monitoring and management is disclosed. The storage medium including executable code which, when executed by a processor, may cause the processor to receive, via an application programming interface, at least one integration contract, the at least one integration contract may relate to a dependency agreement between a plurality of applications; map at least one dependency for each of the plurality of applications based on the at least one integration contract; receive, via the application programming interface, at least one request, the at least one request may relate to a regression testing request for an application; identify at least one test from a test suite based on the at least one request and a result of the mapping; automatically initiate, via an integration layer, the identified at least one test based on at least one predetermined parameter; and capture, via the application programming interface, at least one test result that corresponds to the automatically initiated at least one test.

In accordance with an exemplary embodiment, when executed by the processor, the executable code may further cause the processor to determine at least one fault condition based on the captured at least one test result; identify, based on the result of the mapping, at least one impacted dependency that corresponds to the at least one fault condition; generate at least one report, the at least one report may include information that relates to at least one from among the at least one fault condition and the identified at least one impacted dependency; and transmit at least one first notification in response to the at least one request, the at least one first notification may include the generated at least one report.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
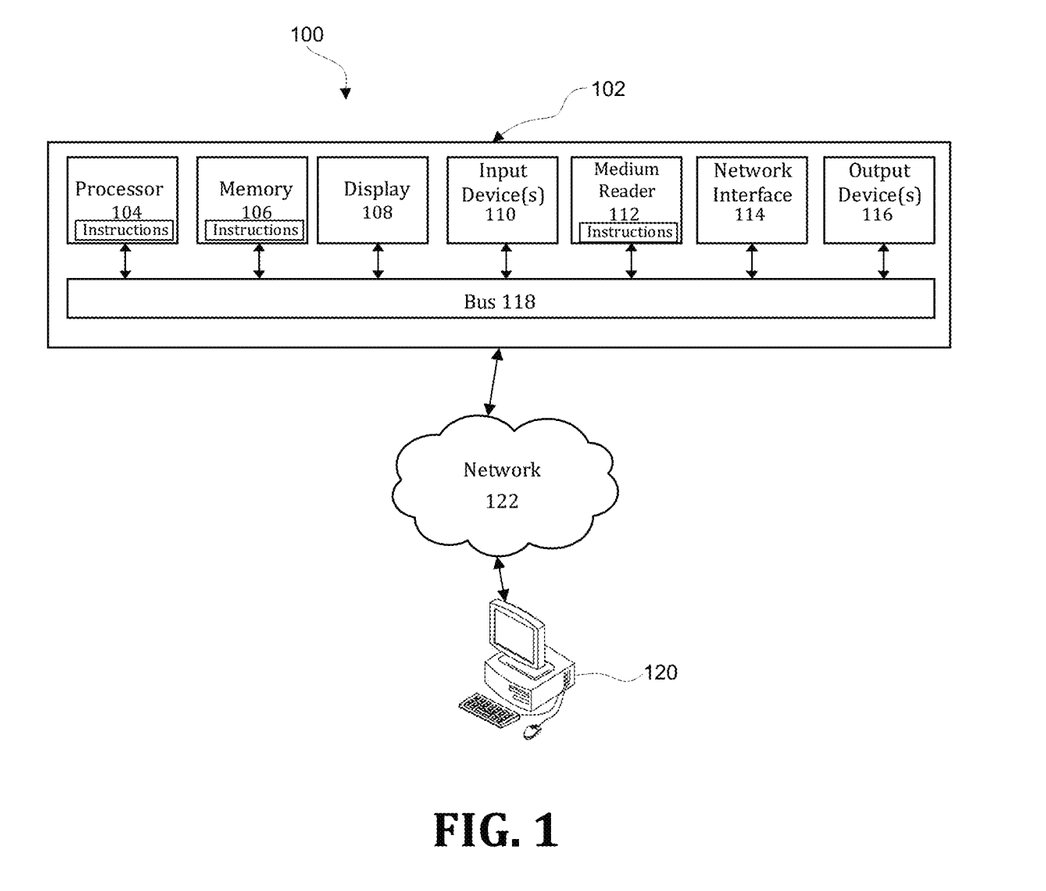
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing integration test monitoring and management by automatically executing test suites as part of a collaborative application development pipeline and automatically alerting affected dependencies of identified error conditions.

Figure 2:
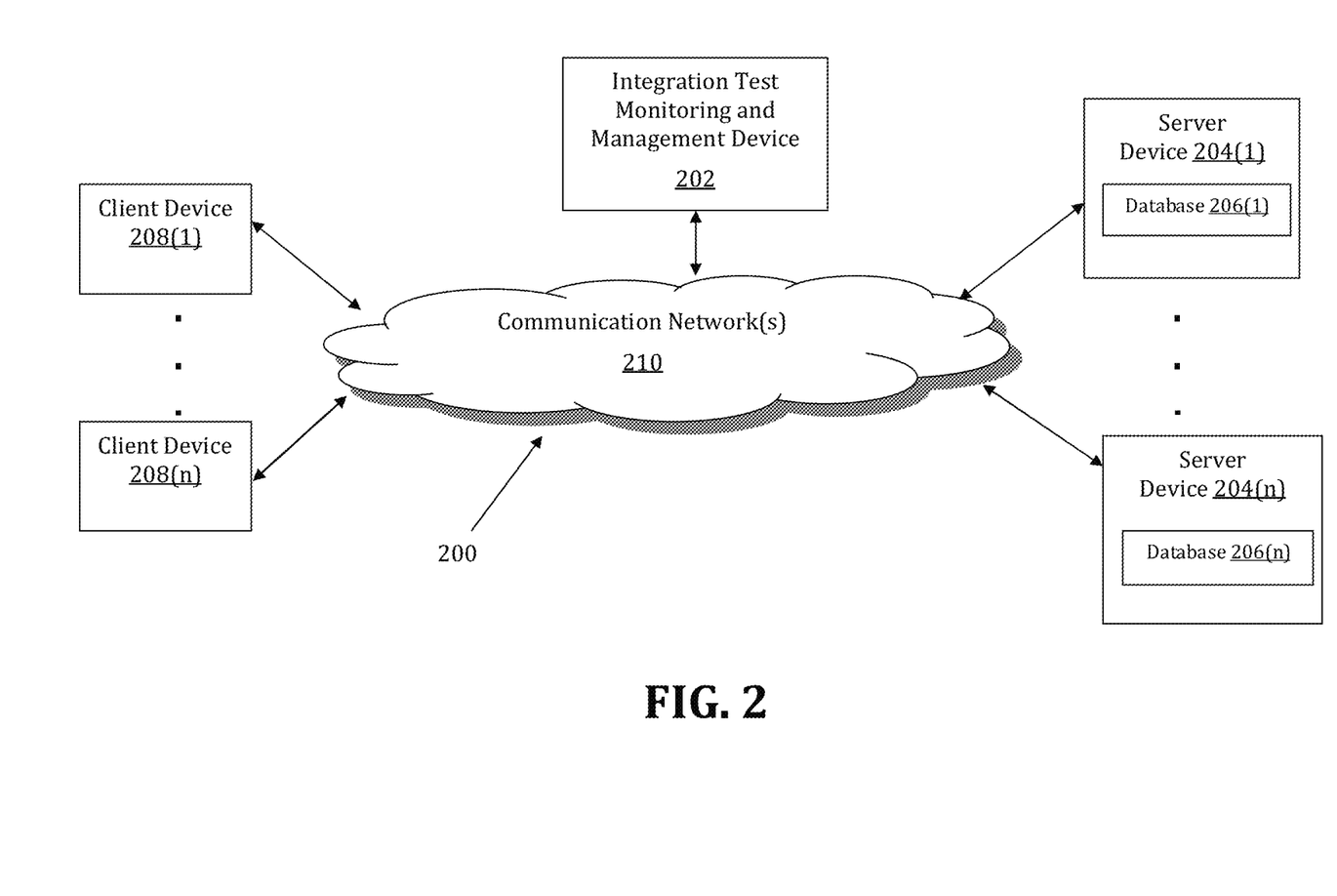
FIG. 2 illustrates an exemplary diagram of a network environment.

Referring to FIG. 2, a schematic of an exemplary network environment 200 for implementing a method for providing integration test monitoring and management by automatically executing test suites as part of a collaborative application development pipeline and automatically alerting affected dependencies of identified error conditions is illustrated. In an exemplary embodiment, the method is executable on any networked computer platform, such as, for example, a personal computer (PC).

The method for providing integration test monitoring and management by automatically executing test suites as part of a collaborative application development pipeline and automatically alerting affected dependencies of identified error conditions may be implemented by an Integration Test Monitoring and Management (ITMM) device 202. The ITMM device 202 may be the same or similar to the computer system 102 as described with respect to FIG. 1. The ITMM device 202 may store one or more applications that can include executable instructions that, when executed by the ITMM device 202, cause the ITMM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ITMM device 202 itself, may be located in virtual server(s) running in a cloud-based computing environment rather than being tied to one or more specific physical network computing devices. Also, the application(s) may be running in one or more virtual machines (VMs) executing on the ITMM device 202. Additionally, in one or more embodiments of this technology, virtual machine(s) running on the ITMM device 202 may be managed or supervised by a hypervisor.

In the network environment 200 of FIG. 2, the ITMM device 202 is coupled to a plurality of server devices 204(1)-204(n) that hosts a plurality of databases 206(1)-206(n), and also to a plurality of client devices 208(1)-208(n) via communication network(s) 210. A communication interface of the ITMM device 202, such as the network interface 114 of the computer system 102 of FIG. 1, operatively couples and communicates between the ITMM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ITMM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ITMM devices that efficiently implement a method for providing integration test monitoring and management by automatically executing test suites as part of a collaborative application development pipeline and automatically alerting affected dependencies of identified error conditions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ITMM device 202 may be a standalone device or integrated with one or more other devices or apparatuses, such as one or more of the server devices 204(1)-204(n), for example. In one particular example, the ITMM device 202 may include or be hosted by one of the server devices 204(1)-204(n), and other arrangements are also possible. Moreover, one or more of the devices of the ITMM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ITMM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to integration contracts, dependency agreements, applications, mapping data, dependency data, regression testing data, integration testing data, test suite data, onboarding data, predetermined parameters, captured test results, fault conditions, and reports.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer- to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ITMM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ITMM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ITMM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ITMM device 202, the server devices 204(1)-204(n), or the client devices 208(1)-208(n), for example, may be configured to operate as virtual instances on the same physical machine. In other words, one or more of the ITMM device 202, the server devices 204(1)-204(n), or the client devices 208(1)-208(n) may operate on the same physical device rather than as separate devices communicating through communication network(s) 210. Additionally, there may be more or fewer ITMM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
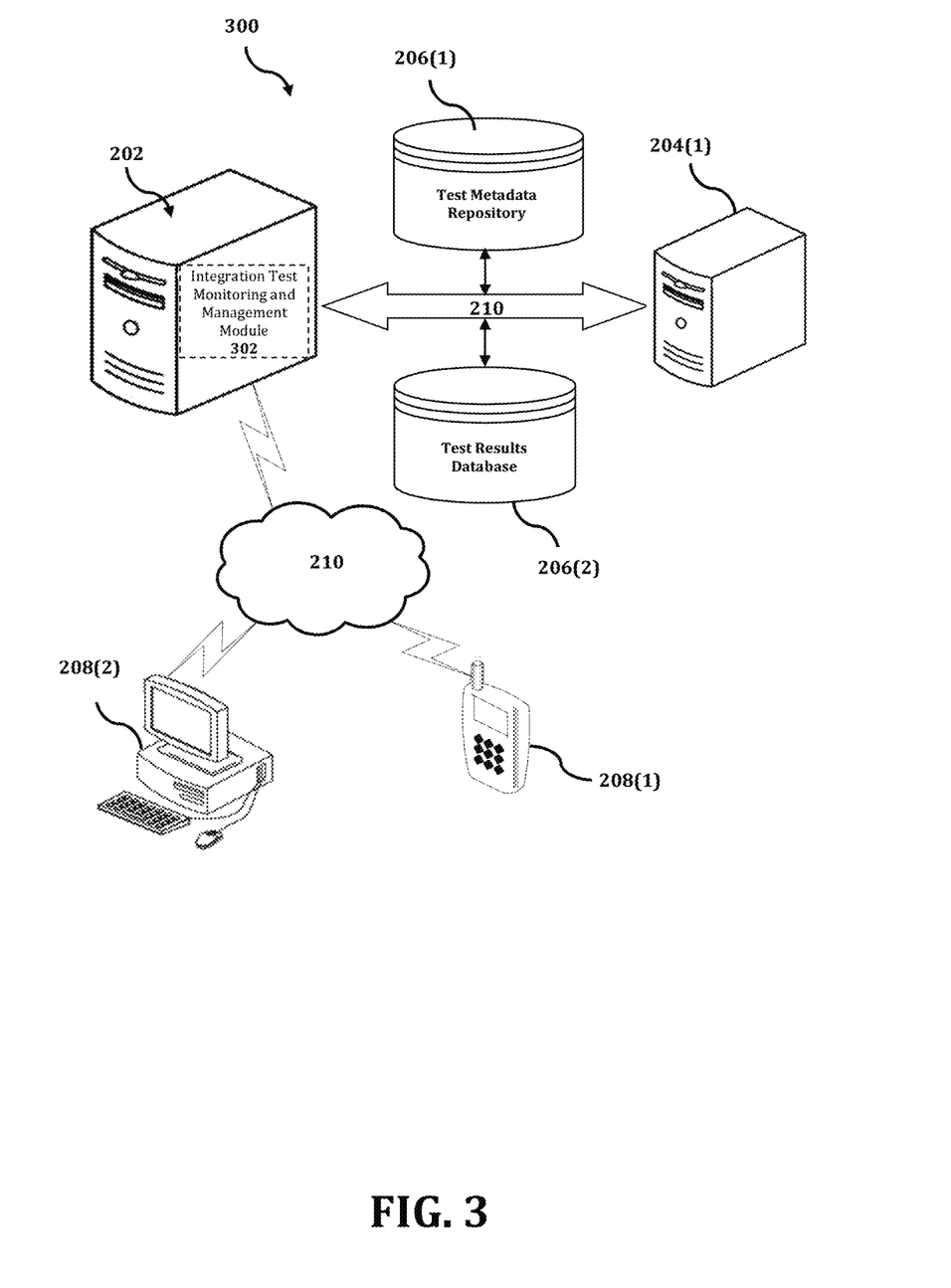
FIG. 3 shows an exemplary system for implementing a method for providing integration test monitoring and management by automatically executing test suites as part of a collaborative application development pipeline and automatically alerting affected dependencies of identified error conditions.

The ITMM device 202 is described and shown in FIG. 3 as including an integration test monitoring and management module 302, although it may include other rules, policies, modules, databases, or applications, for example. As will be described below, the integration test monitoring and management module 302 is configured to implement a method for providing integration test monitoring and management by automatically executing test suites as part of a collaborative application development pipeline and automatically alerting affected dependencies of identified error conditions.

An exemplary process 300 for implementing a mechanism for providing integration test monitoring and management by automatically executing test suites as part of a collaborative application development pipeline and automatically alerting affected dependencies of identified error conditions by utilizing the network environment of FIG. 2 is shown as being executed in FIG. 3. Specifically, a first client device 208(1) and a second client device 208(2) are illustrated as being in communication with ITMM device 202. In this regard, the first client device 208(1) and the second client device 208(2) may be "clients" of the ITMM device 202 and are described herein as such. Nevertheless, it is to be known and understood that the first client device 208(1) and/or the second client device 208(2) need not necessarily be "clients" of the ITMM device 202, or any entity described in association therewith herein. Any additional or alternative relationship may exist between either or both of the first client device 208(1) and the second client device 208(2) and the ITMM device 202, or no relationship may exist.

Further, ITMM device 202 is illustrated as being able to access a test metadata repository 206(1) and a test results database 206(2). The integration test monitoring and management module 302 may be configured to access these databases for implementing a method for providing integration test monitoring and management by automatically executing test suites as part of a collaborative application development pipeline and automatically alerting affected dependencies of identified error conditions.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ITMM device 202 via broadband or cellular communication. Of course, these embodiments are merely exemplary and are not limiting or exhaustive.

Upon being started, the integration test monitoring and management module 302 executes a process for providing integration test monitoring and management by automatically executing test suites as part of a collaborative application development pipeline and automatically alerting affected dependencies of identified error conditions. An exemplary process for providing integration test monitoring and management by automatically executing test suites as part of a collaborative application development pipeline and automatically alerting affected dependencies of identified error conditions is generally indicated at flowchart 400 in FIG. 4.

Figure 4:
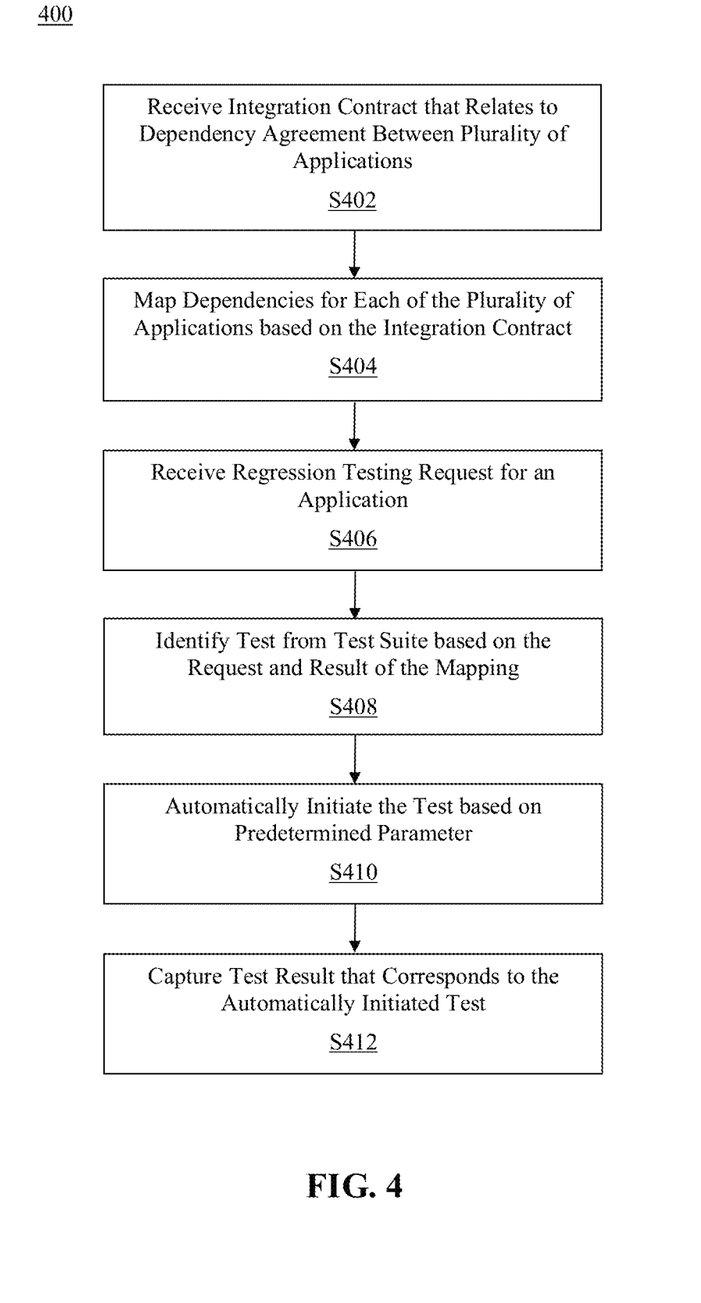
FIG. 4 is a flowchart of an exemplary process for implementing a method for providing integration test monitoring and management by automatically executing test suites as part of a collaborative application development pipeline and automatically alerting affected dependencies of identified error conditions.

In the process 400 of FIG. 4, at step S402, an integration contract may be received via an application programming interface and/or a graphical user interface. The integration contract may relate to a dependency agreement between a plurality of applications. In an exemplary embodiment, the integration contract may outline dependencies between each of the plurality of applications. The integration contract may include information that relates to at least one from among application information, dependency information, and testing information. For example, an integration contract between application A and application B may outline the dependency, and provide information relating to the dependency, of application B to application A. In another exemplary embodiment, the graphical user interface may include a portal that is configured to receive user input.

In another exemplary embodiment, the integration contract may relate to a formal agreement between a plurality of development teams. The formal agreement may include a piece of written, printed, and/or electronic matter that serves as an official record of the agreed upon dependency conditions. In another exemplary embodiment, the integration contract may relate to an informal agreement between the plurality of development teams. The informal agreement may be evidenced by the integration that exists between the plurality of applications. For example, a collaboratively developed group of applications may include integrated test suites, shared communication protocols, and common dependencies which serves to evidence the informal agreement between each of the applications in the group of applications.

In another exemplary embodiment, the disclosed system may infer a relationship between the plurality of applications and document the informal agreement. The inference may be made based on information that relates to at least one from among integrated test suite information, shared communication protocol information, and common dependency information. For example, a collaboratively developed group of applications in a development pipeline may be inferred to have an informal agreement based on characteristics of the group of applications. In another exemplary embodiment, the inferred relationship may require confirmation by associated responsible parties prior to formal documentation. For example, a confirmation from development teams associated with each of the plurality of applications may be required before the inferred relationship between the plurality of applications is documented.

In another exemplary embodiment, the plurality of applications may include at least one from among a web application, a monolithic application, and a microservice application. The monolithic application may describe a single-tiered software application where the user interface and data access code are combined into a single program from a single platform. The monolithic application may be self-contained and independent from other computing applications.

In another exemplary embodiment, the web application may correspond to application software that runs on a web server. Unlike computer-based software programs that run locally on the operating system of a device, the web application may be accessed by the user through a web browser with an active network connection. The web application may be programmed by using a client-server modeled structure wherein the user is provided services via an off-site server. The off-site server may include first-party off-site servers as well as third-party off-site servers.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, a dependency for each of the plurality of applications may be mapped based on the integration contract. Mapping the dependency may include parsing the integration contract to identify the dependency for each of the plurality of applications. Consistent with present disclosures, the dependency may be formally documented in the integration contract or inferred based on information in the integration contract. Then, a confirmation of the integration contract may be automatically requested from each of the dependency. In an exemplary embodiment, the confirmation of the integration contract may be requested from responsible parties such as, for example, development teams that are associated with each of the dependency. Finally, based on a result of the automated request, the dependency may be mapped for each of the plurality of applications.

At step S406, a request may be received via the application programming interface and/or the graphical user interface. In an exemplary embodiment, the request may relate to at least one from among a regression testing request and an integration testing request for an application. The request may be received from a responsible party such as, for example, an associated development team to initiate a test for the application. In another exemplary embodiment, the request may include a predetermined parameter. The predetermined parameter may correspond to a testing parameter that relates to at least one from among an on-demand testing parameter and a scheduled testing parameter.

In another exemplary embodiment, the request for regression testing may include a request to import existing tests and test suites, to manage execution of the test suites, as well as to generate a regression report. The regression report may include information that relates to when the tests were executed and a result such as, for example, success and failure rates of the executed tests. In another exemplary embodiment, the request for integration testing may include a request to browse existing tests and test suites, to create tests and test suites to run against another application, as well as to generate an integration report. The integration report may include information that relates to testing that is being executed by all applications in the plurality of applications.

In another exemplary embodiment, prior to or together with the request, onboarding data and the test suite may be received via the application programming interface and/or the graphical user interface. The onboarding data may include a set of onboarding instructions that corresponds to the test suite and information that relates to the plurality of applications. Then, the test suite may be onboarded for the plurality of applications by using the onboarding data. In another exemplary embodiment, information that relates to the onboarding of the test suite may be persisted together with the onboarding data. The information and the onboarding data may be associated with a corresponding application to facilitate integration test monitoring and management consistent with present disclosures.

At step S408, a test from the test suite may be identified based on the request and a result of the mapping. The test may be identified based on parameters in the request as well as a result of the mapping. In an exemplary embodiment, the request may include an identifier that was assigned to the test during the onboarding of the test suite. For example, the request may include an identification number that is associated with the requested test. In another exemplary embodiment, the test may be identified by using desired testing parameters in the request. For example, a latency test may be identified from the test suite based on testing parameters in the request that indicates a desire to perform latency testing.

At step S410, the identified test may be automatically initiated via an integration layer. The identified test may be automatically initiated based on a predetermined parameter. In an exemplary embodiment, consistent with present disclosures, the request may include the predetermined parameter. The predetermined parameter may relate to at least one from among an on-demand testing parameter and a scheduled testing parameter. In another exemplary embodiment, a variety of different types of tests may be initiated via the integration layer by using a corresponding plugin. The corresponding plugin may enable communication with the test and associated testing tools via a common communication protocol. As will be appreciated by a person of ordinary skill in the art, utilizing an integration layer to initiate the tests enables toolset agnostic testing of the applications when the toolset supports the common communication protocol.

At step S412, a test result may be captured via an application programming interface (API). The test result may correspond to the automatically initiated test. In an exemplary embodiment, the API may correspond to a connection between computer programs. The API may relate to a software interface that offers a service to other pieces of software. In another exemplary embodiment, the API may correspond to a software architectural style such as, for example, a representational state transfer (REST) architectural style that defines a set of constraints for how the architecture of an internet-scale distributed hypermedia system should behave. The REST architectural style may emphasize the scalability of interactions between components, uniform interfaces, independent deployment of components, and the creation of a layered architecture.

In another exemplary embodiment, a fault condition based on the captured test result may be determined. The fault condition may relate to an error that was detected by the automatically initiated test. In another exemplary embodiment, an impacted dependency that corresponds to the fault condition may be identified based on the result of the mapping. For example, the result of the automatically initiated test may indicate that the fault condition relates to a programmatic interface of an application. As a result, dependent applications that rely on the programmatic interface of the application may also be affected by the fault condition.

In another exemplary embodiment, a report may be generated. The report may include information that relates to at least one from among the fault condition and the identified impacted dependency. In another exemplary embodiment, a first notification may be transmitted in response to the request. The first notification may include the generated report. In another exemplary embodiment, the first notification may include graphical elements that are displayable on the graphical user interface. The graphical elements may be configured to display information for a user as well as receive input from the user. As will be appreciated by a person of ordinary skill in the art, transmission of the report in response to the request may provide visibility into the content of the test suites and the test execution history.

In another exemplary embodiment, consistent with present disclosures, a responsible party that is associated with the impacted dependency may be identified. Then, a second notification may be transmitted to the identified responsible party. The second notification may include the generated report. In another exemplary embodiment, the second notification may include graphical elements that are displayable on the graphical user interface. The graphical elements may be configured to display information for a user as well as receive input from the user. As will be appreciated by a person of ordinary skill in the art, transmission of the report to the responsible party that is associated with the impacted dependency may provide visibility into the content of test suites and the test execution history of dependent applications.

In another exemplary embodiment, an interested user may subscribe to receive information that relates to an executed test. Then, a third notification may be transmitted to the interested user based on the subscription. The third notification may include the generated report. In another exemplary embodiment, the third notification may include graphical elements that are displayable on the graphical user interface. The graphical elements may be configured to display information for the interested user as well as receive input from the interested user.

Figure 5:
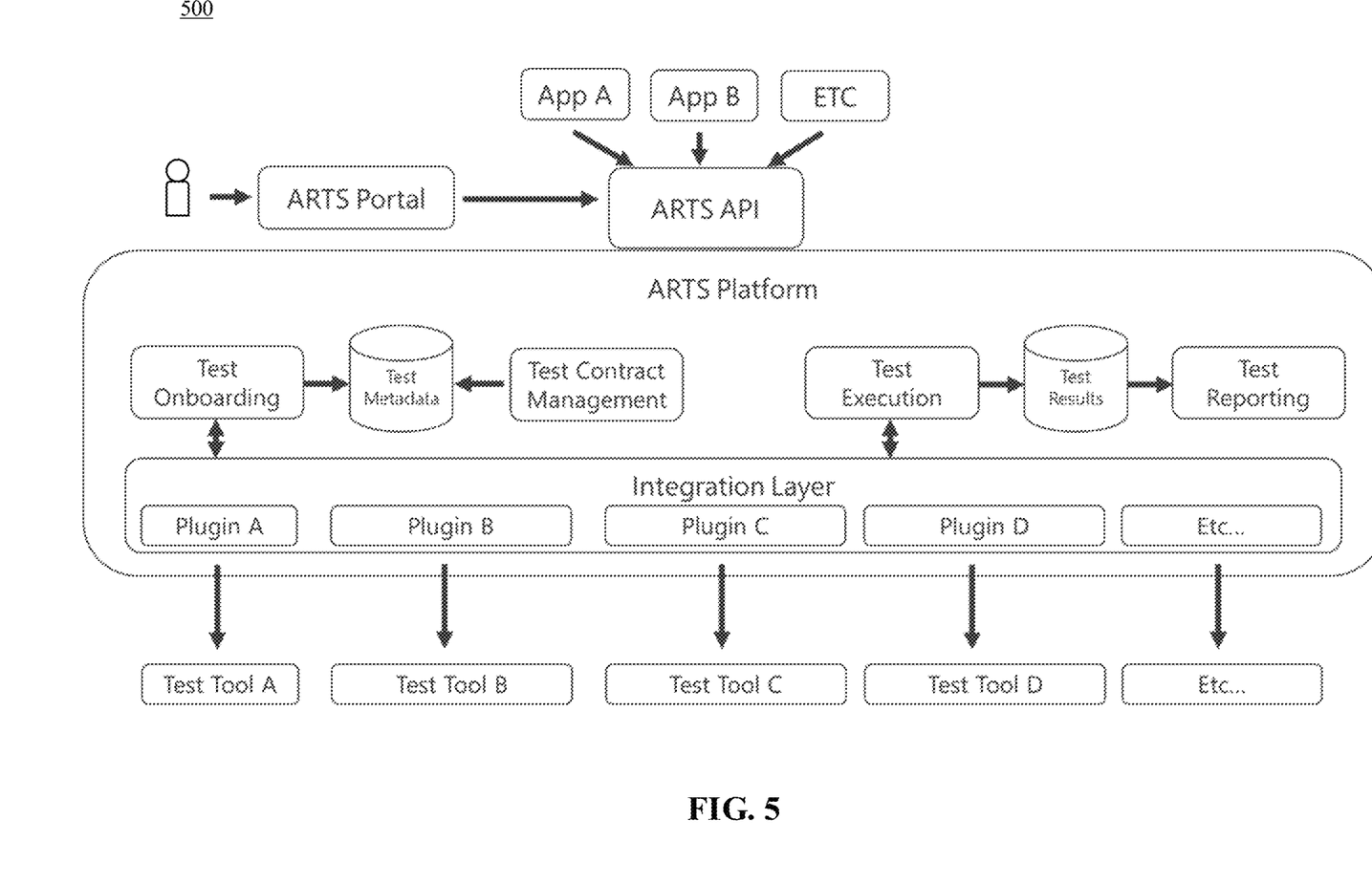
FIG. 5 is an architecture diagram of an exemplary process for implementing a method for providing integration test monitoring and management by automatically executing test suites as part of a collaborative application development pipeline and automatically alerting affected dependencies of identified error conditions.

FIG. 5 is an architecture diagram 500 of an exemplary process for implementing a method for providing integration test monitoring and management by automatically executing test suites as part of a collaborative application development pipeline and automatically alerting affected dependencies of identified error conditions. In FIG. 5, a high-level architecture diagram for an automated regression test system consistent with present disclosures is provided.

As illustrated in FIG. 5, a user such as, for example, a development team may interact with the disclosed platform via a graphical user interface such as, for example, a portal. The disclosed system may utilize an application programming interface (API) to interface with the user portal and a plurality of applications. The plurality of applications may relate to applications that the user would like to test.

The disclosed platform may include components that interact with an integration layer to facilitate test contract management and test onboarding. The metadata that are associated with the tests may be persisted in a test metadata repository. The disclosed platform may also include components that interact with the integration layer to facilitate test execution and test reporting. The test results that are associated with the executed tests may be persisted in a test results database.

The integration layer may be usable by the disclosed platform to initiate the tests. The integration layer may include plugins that corresponds to the toolset of the desired tests. For example, to initiate test A, the disclosed platform may utilize corresponding plugin A to initiate testing tool A. Consistent with present disclosures, the integration layer may utilize an API to interface with the testing tools.

Accordingly, with this technology, an optimized process for providing integration test monitoring and management by automatically executing test suites as part of a collaborative application development pipeline and automatically alerting affected dependencies of identified error conditions is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing integration test monitoring and management, the method being implemented by at least one processor, the method comprising:
 receiving, by the at least one processor via an application programming interface, at least one integration contract, the at least one integration contract relating to a dependency agreement between a plurality of applications;
 mapping, by the at least one processor, at least one dependency for each of the plurality of applications based on the at least one integration contract;

receiving, by the at least one processor via the application programming interface, at least one request, the at least one request relating to a regression testing request for an application;

identifying, by the at least one processor, at least one test from a test suite based on the at least one request and a result of the mapping;

automatically initiating, by the at least one processor via an integration layer, the identified at least one test based on at least one predetermined parameter; and capturing, by the at least one processor via the application programming interface, at least one test result that corresponds to the automatically initiated at least one test.

2. The method of claim 1, further comprising:
determining, by the at least one processor, at least one fault condition based on the captured at least one test result;

identifying, by the at least one processor based on the result of the mapping, at least one impacted dependency that corresponds to the at least one fault condition;

generating, by the at least one processor, at least one report, the at least one report including information that relates to at least one from among the at least one fault condition and the identified at least one impacted dependency; and transmitting, by the at least one processor, at least one first notification in response to the at least one request, the at least one first notification including the generated at least one report.

3. The method of claim 2, further comprising:
identifying, by the at least one processor, at least one responsible party that is associated with the at least one impacted dependency; and transmitting, by the at least one processor, at least one second notification to the identified at least one responsible party, the at least one second notification including the generated at least one report.

4. The method of claim 1, wherein the at least one request includes the at least one predetermined parameter, the at least one predetermined parameter relating to at least one from among an on-demand testing parameter and a scheduled testing parameter.

5. The method of claim 1, prior to receiving the at least one request, further comprises:
receiving, by the at least one processor, onboarding data together with the test suite, the onboarding data including a set of onboarding instructions that corresponds to the test suite and information that relates to the plurality of applications; and onboarding, by the at least one processor, the test suite for the plurality of applications by using the onboarding data.

6. The method of claim 1, wherein mapping the at least one dependency further comprises:
parsing, by the at least one processor, the at least one integration contract to identify the at least one dependency for each of the plurality of applications;

automatically requesting, by the at least one processor, confirmation of the at least one integration contract from each of the at least one dependency; and mapping, by the at least one processor, the at least one dependency based on a result of the requesting.

7. The method of claim 6, wherein identifying the at least one dependency for each of the plurality of applications further comprises:

extracting, by the at least one processor, information that relates to the plurality of applications from the parsed at least one integration contract; and inferring, by the at least one processor, the at least one dependency for each of the plurality of applications by using the extracted information.

8. The method of claim 7, wherein the information includes at least one from among integrated test suite information, shared communication protocol information, and common dependency information.

9. The method of claim 1, wherein automatically initiating the identified at least one test via the integration layer further comprises:
automatically identifying, by the at least one processor, at least one plug-in that corresponds to each of the identified at least one test, the at least one plug-in enabling communication with the identified at least one test and at least one associated testing tool; and automatically initiating, by the at least one processor via the integration layer, each of the identified at least one test by using the corresponding at least one plug-in, wherein each of the identified at least one test is automatically initiated based on the at least one predetermined parameter.

10. A computing device configured to implement an execution of a method for providing integration test monitoring and management, the computing device comprising:
a processor;
a memory; and
a communication interface coupled to each of the processor and the memory,
wherein the processor is configured to:
receive, via an application programming interface, at least one integration contract, the at least one integration contract relating to a dependency agreement between a plurality of applications;

map at least one dependency for each of the plurality of applications based on the at least one integration contract;

receive, via the application programming interface, at least one request, the at least one request relating to a regression testing request for an application;

identify at least one test from a test suite based on the at least one request and a result of the mapping;

automatically initiate, via an integration layer, the identified at least one test based on at least one predetermined parameter; and capture, via the application programming interface, at least one test result that corresponds to the automatically initiated at least one test.

11. The computing device of claim 10, wherein the processor is further configured to:
determine at least one fault condition based on the captured at least one test result;

identify, based on the result of the mapping, at least one impacted dependency that corresponds to the at least one fault condition;

generate at least one report, the at least one report including information that relates to at least one from among the at least one fault condition and the identified at least one impacted dependency; and transmit at least one first notification in response to the at least one request, the at least one first notification including the generated at least one report.

12. The computing device of claim 11, wherein the processor is further configured to:

identify at least one responsible party that is associated with the at least one impacted dependency; and transmit at least one second notification to the identified at least one responsible party, the at least one second notification including the generated at least one report.

13. The computing device of claim 10, wherein the at least one request includes the at least one predetermined parameter, the at least one predetermined parameter relating to at least one from among an on-demand testing parameter and a scheduled testing parameter.

14. The computing device of claim 10, wherein, prior to receiving the at least one request, the processor is further configured to:

receive onboarding data together with the test suite, the onboarding data including a set of onboarding instructions that corresponds to the test suite and information that relates to the plurality of applications; and onboard the test suite for the plurality of applications by using the onboarding data.

15. The computing device of claim 10, wherein, to map the at least one dependency, the processor is further configured to:

parse the at least one integration contract to identify the at least one dependency for each of the plurality of applications;

automatically request confirmation of the at least one integration contract from each of the at least one dependency; and map the at least one dependency based on a result of the requesting.

16. The computing device of claim 15, wherein, to identify the at least one dependency for each of the plurality of applications, the processor is further configured to:

extract information that relates to the plurality of applications from the parsed at least one integration contract; and infer the at least one dependency for each of the plurality of applications by using the extracted information.

17. The computing device of claim 16, wherein the information includes at least one from among integrated test suite information, shared communication protocol information, and common dependency information.

18. The computing device of claim 10, wherein, to automatically initiate the identified at least one test via the integration layer, the processor is further configured to:

automatically identify at least one plug-in that corresponds to each of the identified at least one test, the at least one plug-in enabling communication with the identified at least one test and at least one associated testing tool; and automatically initiate, via the integration layer, each of the identified at least one test by using the corresponding at least one plug-in, wherein each of the identified at least one test is automatically initiated based on the at least one predetermined parameter.

19. A non-transitory computer readable storage medium storing instructions for providing integration test monitoring and management, the storage medium comprising executable code which, when executed by a processor, causes the processor to:

receive, via an application programming interface, at least one integration contract, the at least one integration contract relating to a dependency agreement between a plurality of applications;

map at least one dependency for each of the plurality of applications based on the at least one integration contract;

receive, via the application programming interface, at least one request, the at least one request relating to a regression testing request for an application;

identify at least one test from a test suite based on the at least one request and a result of the mapping;

automatically initiate, via an integration layer, the identified at least one test based on at least one predetermined parameter; and capture, via the application programming interface, at least one test result that corresponds to the automatically initiated at least one test.

20. The storage medium of claim 19, wherein, when executed by the processor, the executable code further causes the processor to:

determine at least one fault condition based on the captured at least one test result;

identify, based on the result of the mapping, at least one impacted dependency that corresponds to the at least one fault condition;

generate at least one report, the at least one report including information that relates to at least one from among the at least one fault condition and the identified at least one impacted dependency; and transmit at least one first notification in response to the at least one request, the at least one first notification including the generated at least one report.

* * * * *